United States Patent Office 3,511,839
Patented May 12, 1970

3,511,839
SUBSTITUTED BENZOIC ACID ESTERS OF CERTAIN DIBENZ[b,f]AZEPINE DERIVATIVES
Kurt Adank, Muttenz, Basel-Land, and Armin Züst, Birsfelden, Basel-Land, Switzerland, assignors to Geigy Chemical Corporation, Greenburgh, N.Y., a corporation of Delaware
No Drawing. Filed June 2, 1966, Ser. No. 554,690
Claims priority, application Switzerland June 11, 1965, 8,201/65
Int. Cl. C07d 51/70
U.S. Cl. 260—268                                5 Claims

ABSTRACT OF THE DISCLOSURE 5-alkenyl dibenz[b,f] azepines substituted by an esterified heterocyclic alkanol group are coronary dilators. An illustrative embodiment is 2-{4-[3-(3-chloro-5H-dibenz[b,f]azepine-5-yl)-propyl]piperazine-(1)} ethyl 3,4,5-trimethoxybenzoate.

This invention relates to new azepines which possess valuable therapeutical properties.
More in particular, the invention concerns azepine derivatives of the formula

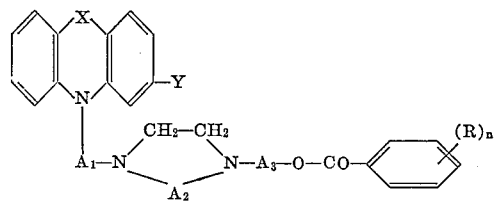

(I)

in which
X represents the ethylene or vinylene radical,
Y represents hydrogen, a halogen atom, a lower alkoxy radical or the trifluoromethyl radical,
$A_1$ and $A_3$ represent identical or different alkylene radicals each having from 2 to 4 chain members and from 2 to 5 carbon atoms in a straight or branched chain,
$A_2$ represents the ethylene, propylene or trimethylene radical,
R represents a lower alkyl or lower alkoxy group, and
$n$ represents an integer ranging from 0 to 3, or
$(R)n$ can also represent the methylenedioxy group or a chlorine atom,
and their addition salts with inorganic and organic acids, which compounds have an intensive, protracted dilatory effect on the coronary vessels.

In contrast to the coronary dilators presently available to the physician, the compounds according to this invention exert coronary dilating action of high specifity, i.e., they are substantially free from activity on the peripheral blood vessels and also have a significantly weaker hypotensive action. At the same time their therapeutic index is very favourable. These therapeutically desirable advantages offered by the compounds according to the invention are absent in the coronary dilators presently in use, and render the compounds of the invention useful for the treatment of acute and chronic coronary ininsufficiency (angina pectoris) and for the prevention and follow-up treatment of myocardial infarction.

Moreover, in contrast to those known phenothiazines of similar substitution which possess coronary activity, the compounds according to the invention are, very surprisingly, substantialy free from action on the central nervous system, and in particular free form ataractic activity.

In the compounds of Formula I and in starting materials, mentioned below, which are used for their production, Y is, e.g., a hydrogen, chlorine or bromine atom or the methoxy, ethoxy, n-propoxy or isopropoxy group or the trifluoromethyl radical. $A_1$ and $A_3$ independently of each other are, e.g., ethylene, propylene, tri-methylene, 1-methyl-trimethylene, 2-methyl-trimethylene, 3-methyl-trimethylene, 2,2-dimethyl-trimethylene of tetramethylene radicals. R is, e.g., the methyl, methoy, ethoxy, n-propoxy, isoproxy or n-butoxy group.

Wherever in this specification or the appended claims, the terms "low" or "lower" are used in connection with an aliphatic radical, this means that such radical has not more than 4 carbon atoms.

To produce the new compounds of Formula I, a compound of the general formula

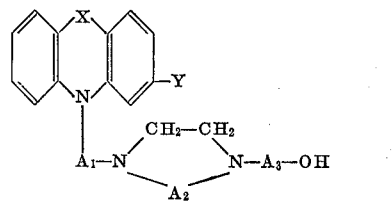

(II)

wherein X, Y, $A_1$, $A_2$ and $A_3$ have the meanings given in Formula I, is reacted with a reactive functional derivative of a carboylic acid of the general Formula III

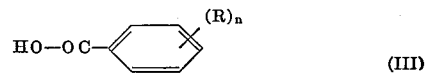

(III)

wherein R, $n$ and $(R)n$ have the meanings given in Formula I, or a reactive ester of a compound of general Formula II is reacted with a salt of a carboxylic acid of general Formula III. Suitable derivatives of acids of general Formula III are, in particular, their halides and anhydrides, as well as mixed anhydrides, e.g., with carbonic acid half esters of low alkanols. The reaction is performed, e.g., in the presence of an acid binding agent such as pyridine or triethylamine; and excess thereof or an inert organic solvent such as benzene, toluene, chloroform or dichloroethane can serve as reaction medium. The reaction temperature is preferably between 0° and the boiling temperature of the reaction medium. Also an alkali metal or an alkali metal compound such as sodium, potassium, lithium, sodium amide, lithium amide, sodium hydride or lithium hydride can serve as acid binding agent. Preferably, immediately before the further reaction, the compound of Formula II is converted, by the action of such agents in an inert solvent such as benzene or toluene, into its alkali metal compound.

The reaction of a salt, e.g., a sodium, potassium, lead or silver salt, of an acid of the general Formula III with a reactive ester of a compound of general Formula II is performed at room temperature or moderately elevated temperature, e.g., in a solvent or diluent such as isopropanol, acetone, dioxane, benzene, toluene or chloroform. Suitable reactive esters are, e.g., the chlorides, bromides, methane sulphonic acid esters or arylsulphonic acid esters such as p-toluene sulphonic acid esters which, e.g., can be obtained from the compounds of general Formula II by reaction with the corresponding phosphorus halides or sulphonic acid chlorides.

The compounds of general Formula I are produced by a second process by reacting a compound of the general Formula IV

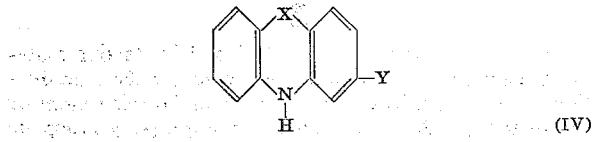

wherein X and Y have the meanings given above, with a reactive ester, e.g., a chloride, bromide, methane sulphonic acid ester of a compound of general Formula V

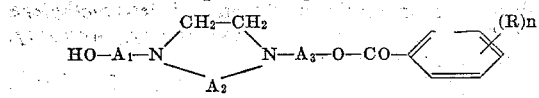

wherein $A_1$, $A_2$, $A_3$, R, n and (R)n have the meanings given in Formula I, the reaction being performed in the presence of an alkaline condensing agent. Suitable condensing agents are, in particular, sodium amide, lithium amide, potassium amide, sodium, potassium, lithium, butyl lithium, phenyl lithium, sodium hydride or lithium hydride. The reaction can be performed in the presence or absence of an inert organic solvent such as toluene, benzene or dimethyl formamide, at temperatures between about 5° and about 120° or the boiling temperature of the solvent used.

A third process for the production of compounds of the general Formula I, and a fourth process which is related thereto, consist in reacting a reactive ester of a compound of the general Formula VI

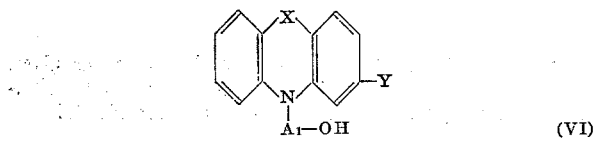

with a compound of the general Formula VII

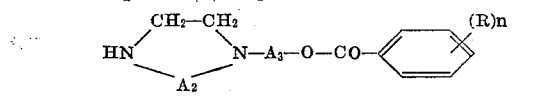

or reacting a compound of the general Formula VIII

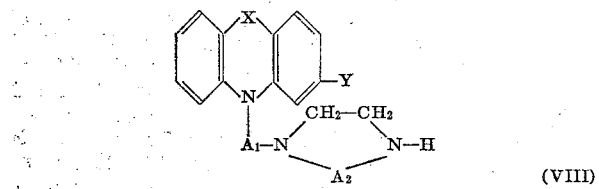

with a reactive ester of a compound of the general Formula IX

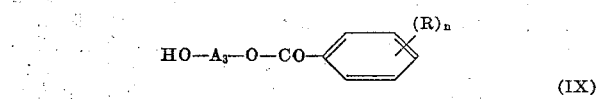

these reactions preferably being performed in the presence of an acid binding agent. In general Formulae VI, VII, VIII and IX, X, Y, $A_1$, $A_2$, $A_3$, R, n and (R)n have the meanings given in Formula I. Both reactions can be performed, e.g., at moderately elevated temperatures in organic solvents such as dimethyl formamide, sodium or potassium carbonate, for example, being used as acid binding agent. Halides, particularly chlorides and bromides, also methane sulphonic acid esters as well as aryl sulphonic acid esters, e.g., p-toluene sulphonic acid esters, for example, are suitable as reactive esters of compounds of the general Formulae VI and IX.

Starting materials of the general Formulae II and IV, as well as reactive esters of compounds of the general Formulae VI and IX, particularly chlorides and bromides, are known and others can be produced analogously thereto. Also, numerous reactive functional derivatives of acids of the general Formula III are known or can be produced in the usual way from the known acids. Reactive esters, particularly the chlorides and bromides, of compounds of the general Formula V are obtained, e.g., by reacting compounds of the general Formula VII with nongeminal low dihalogen alkanes, preferably those having two different halogen atoms such as bromochloroalkanes, or reacting them with low methane sulphonic acid halogen alkyl esters or aryl sulphonic acid halogen alkyl esters, in the presence of acid binding agents. Starting materials of the general Formula VII are obtained, e.g., by reacting reactive esters of compounds of the general Formula IX with piperazine, 2-methyl-piperazine or homopiperazine, an excess of which can serve as acid binding agent. Starting materials of the general Formula VIII can be produced, e.g., by reacting reactive esters of compounds of the general Formula VI with piperazine, 2-methyl-piperazine or homopiperazine. Starting materials of the general Formula VIII are obtained likewise by reacting the analogous compounds, some of which are known, which contain the methyl radical instead of the hydrogen atom in the 4-position of the piperazine or homopiperazine ring, with a low chloroformic acid alkyl ester or with cyanogen bromide and hydrolysing the N-carbalkoxy or N-cyano compound formed by liberation of methyl chloride or methyl bromide, e.g., by heating with sodium hydroxide in diethylene glycol monomethyl ether or with dilute aqueous hydrochloric acid.

The compounds of the general Formula I obtained by the processes according to the invention are then converted, if desired, into their addition salts with inorganic and organic acids in the usual way. For example, the acid desired as salt component or a solution thereof is added to a solution of a compound of the general Formula I in an organic solvent such as methanol, ethanol or ether, and the salt which precipitates is isolated.

For use as medicaments, instead of the free bases, non-toxic acid addition salts can be used, i.e., salts with those acids the anions of which are pharmaceutically acceptable in the dosages usual. Also it is of advantage if the salts to be used as medicaments crystallise well and are not or are only slightly hygroscopic. Hydrochloric acid, hydrobromic acid, sulphuric acid, phosphoric acid, methane sulphonic acid, ethane sulphonic acid, $\beta$-hydroxyethane sulphonic acid, acetic acid, malic acid, tartaric acid, citric acid, lactic acid, oxalic acid, succinic acid, fumaric acid, maleic acid, benzoic acid, salicyclic acid, phenylactic acid, mandelic acid and embonic acid, for example, can be used for salt formation with compounds of the general Formula I.

The new active substances are administered orally, rectally and parenterally. The daily dosages of the free bases or of pharmaceutically acceptable salts thereof vary between 5 mg. and 200 mg. for adult patients. Suitable dosage units such as dragees (sugar coated tablets), tablets, suppositories or ampoules, preferably contain 5–50 mg. of an active substance according to the invention or a pharmaceutically acceptable salt thereof.

Dosage units for oral administration preferably contain between 1–90% of a compound of the general Formula I or of a pharmaceutically acceptable salt thereof as active substance. They are produced by combining the active substance, e.g., with solid, pulverulent carriers such as lactose, sucrose, sorbitol, mannitol; starches such as potato starch, maize starch or amylopectin, also laminaria powder or citrus pulp powder; cellulose derivatives or gelatin, optionally with the addition of lubricants such as magnesium or calcium stearate or polyethylene glycols (Carbowax) of suitable molecular weights, to form tablets or dragee cores. The latter are coated, e.g., with concentrated sugar solutions which can also contain, e.g., gum arabic, talcum and/or titanium dioxide, or with a lacquer dissolved in easily volatile organic solvents or mixture of solvents. Dyestuffs can be added to these coatings, e.g., to distinguish between varying dosages of active substance.

Examples of dosage units for rectal administration are suppositories which consist of a combination of an active substance of a suitable salt thereof with a neutral fatty foundation, or also gelatin rectal capsules which contain a combination of the active substance or a suitable salt thereof with polyethylene glycols (Carbowax) of suitable molecular weight.

Ampoules for parenteral administration preferably contain a water soluble salt of an active substance in a concentration of, preferably, 0.2–5%, in aqueous solution, optionally together with suitable stabilising agents and buffer substances.

The following prescriptions further illustrate the production of tablets and dragees:

(a) 250 g. of difumarate of 2-{4-[3-(3-chloro-5H-dibenz[b,f]azepin - 5 - yl)-propyl] - piperazine-(1)}-ethyl-3,4,5-trimethoxybenzoate are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silica are mixed in and the mixture is pressed into 10,000 tablets each weighing 100 mg. and containing 25 mg. of active substance (the aforesaid difumarate). If desired, the tablets can be grooved for better adaptation of the dosage.

(b) A granulate is produced from 250 g. dimaleate of 2-{4-[3-(5H - dibenz[b.f]azepin - 5 - yl)-propyl]-piperazine-(1)} - ethyl - 3,4,5 - trimethoxybenzoate, 175.90 g. of lactose and the alcoholic solution of 10 g. of stearic acid. After drying, the granulate is mixed with 56.60 g. of colloidal silica, 165 g. of talcum, 20 g. of potato starch and 2.50 g. of magnesium stearate and the mixture is pressed into 10,000 dragee cores. These are then coated with a concentrated syrup made from 502.28 g. of crystallized sucrose, 6 g. of shellac, 10 g. of gum arabic, 0.22 g. of dyestuff and 1.5 g. of titanium dioxide and dried. The dragees obtained each weigh 120 mg. and contain 25 mg. of active substance (the aforesaid dimaleate).

The following nonlimitative examples illustrate the invention further. The temperatures are given in degrees Centigrade. Percentages are given by weight.

EXAMPLE 1

17 g. of benzoyl chloride in 50 ml. of anhydrous chloroform are added dropwise to a solution of 36 g. of 2-{4-[3-(5H-dibenz[b,f]azepin - 5 - yl) - propyl] - piperazine-(1)}-ethanol (M.P. 94–96°), in 150 ml. of anhydrous pyridine, the addition being made at 0–5° while stirring well. The whole is then stirred for 6 hours at room temperature, whereupon the reaction solution is concentrated in vacuo, the residue is taken up in methylene chloride, the methylene chloride solution is washed with water and with ice-cold, dilute sodium hydroxide solution and dried with anhydrous sodium sulphate. After evaporating the solvent, the crude base of 2-{4-[3-(5H-dibenz[b,f]azepin - 5 - yl)-propyl]-piperazine-(1)}-ethyl benzoate remains as an oil. This is purified by dissolving it in benzene, charging a column containing 400–500 g. of alumina (activity I) with the benzene solution and subsequently eluating the column with benzene, benzene/petroleum ether.

On recrystallising the eluate from petroleum ether or ether/petroleum ether, the base is obtained as crystals which melt at 74–75°. The base is dissolved in ethanol and the dimaleate (M.P. 174–176°) or the dihydrochloride (M.P. 208–210°) is produced by adding either maleic acid or hydrochloric acid respectively.

Also 2-{4-[3-(5H-dibenz[b,f]azepin - 5 - yl)-propyl]-piperazine - (1)}-ethyl 4-methyl benzoate can be produced in an analogous manner, the dihydrochloride melts at 195–196°. In an analogous manner is further obtained:
2-{4-[3-(5H - dibenz[b.f]azepin - 5 - yl) - propyl]-piperazine-(1)}-ethyl p-chloro-benzoate; dihydrochloride-hydrate M.P. 202–204°.

EXAMPLE 2

18.5 g. of 2-{4-[3-(10,11-dihydro-5H-dibenz[b,f]azepin-5-yl)-propyl]-piperazine-(1)}-ethanol are dissolved in 100 ml. of anhydrous pyridine and, while stirring well at 3°, 20 g. of 3,4,5-trimethoxybenzoyl chloride dissolved in 80 ml. of chloroform are added. The mixture is left to stand for 15 hours at room temperature and then is evaporated to dryness in vacuo. The residue is taken up in methylene chloride, washed with ice cold, diluted sodium hydroxide solution and then with water, dried with sodium sulphate and concentrated. The oil which remains is dissolved in ethanol, fumaric acid is added whereupon it is heated for a few minutes on a water bath. After cooling, the difumarate of 2-{4-[3-(10,11-dihydro-5H-dibenz[b,f]azepin - 5 - yl) - propyl] - piperazine - (1)}-ethyl 3,4,5-trimethoxy benzoate is filtered off under suction and dried at 80–110° in vacuo. It melts at 189–190°.

The following compounds are produced analogously:

the difumarate of 2-{4-[3-(3-methoxy-10,11-dihydro-5H - dibenz[b,f]azepin - 5 - yl) - propyl] - piperazine-(1)}-ethyl 3,4,5-trimethoxy benzoate, M.P. 153–155°;
the dimaleate of 2-{4-[2-(5H-dibenz[b,f]azepin-5-yl)-1-methylethyl]-piperazine-(1)}-ethyl 3,4,5-trimethoxy benzoate, M.P. 150–151° (from 90% aqueous ethanol);
the dihydrochloride of 2-{4-[2-(10,11-dihydro-5H-dibenz[b,f]azepine - 5 - yl) - ethyl] - piperazine - (1)}-ethyl piperonylate, M.P. 230–232° (from acetone/ethanol).

EXAMPLE 3

18.5 g. (0.05 mol) of 2-{4-[3-(5H-dibenz[b,f]azepin-5-yl)-propyl] - piperazine - (1)} - ethanol (M.P. 94–96°) are dissolved in 250 ml. of anhydrous toluene, the solution is heated to 70° and 8 ml. of a sodium amide suspension (containing 2.54 g. of sodium amide in anhydrous toluene) are added dropwise. The reaction mixture is refluxed for 2 hours and the ammonia liberated is removed with nitrogen. After cooling to 70°, a solution of 15.0 g. of 3,4,5-trimethoxybenzoyl chloride in 100 ml. of toluene is slowly added dropwise and the reaction mixture is then heated for 16 hours at 70°. It is then cooled, water is added and it is extracted twice with 200 ml. of 1 N sodium bicarbonate solution each time. The organic phase is washed with water and dried over sodium sulphate. The solvent is evaporated in vacuo and the residue is taken up in 200 ml. of ether and 9.0 g. of oxalic acid are added whereupon the dioxalate of 2-{4-[3-(5H-dibenz[b,f]azepin - 5 - yl) - propyl] - piperazine - (1)}-ethyl 3,4,5-trimethoxybenzoate precipitates.

33.7 g. of the dioxalate obtained are extracted with 300 ml. of methylene chloride and 100 ml. of 2 N sodium hydroxide solution, the organic phase is washed with water, dried over sodium sulphate and the solvent is evaporated in vacuo. The free base, which remains in the form of an oil, is dissolved in a mixture of 100 ml. of ether and 100 ml. of acetone and a solution of 11.6 g. of maleic acid in 50 ml. of acetone is added. The dimaleate which precipitates is filtered off, washed with ether and dried in vacuo at 40°. If desired, it is then recrystallised from anhydrous ethanol/ether. The dimaleate of 2-{4-[3-(5H-dibenz[b,f]azepin-5-yl) - propyl] - piperazine-(1)}ethyl 3,4,5-trimethoxybenzoate so obtained melts at 161–162°.

The dihydrochloride produced analogously melts at 196–198°.

The following compounds are obtained in an analogous manner:

the difumarate of 2-{4-[3-(5H-dibenz[b,f]azepin-5-yl)-2 - methyl - propyl] - piperazine-(1)}-ethyl 3,4,5-trimethoxybenzoate, M.P. 175–177°; the dimaleate melts at at 156–157°;

the difumarate of 2-{4-[3-(3-chloro-5H-dibenz[b,f]azepin - 5 - yl) - propyl] - piperazino - (1)} - ethyl 3,4,5-trimethoxybenzoate, M.P. 159–160°; the dimaleate melts at 167–168°; as well as the following ester salts of 2-{4-[3-5H-dibenz[b,f]azepin-5-yl)-propyl]-piperazine-(1)}-ethanol:

p-anisic acid ester, dimaleate M.P. 175–176°;
o-anisic acid ester, dimaleate M.P. 157–158°;
veratric acid ester, dihydrochloride M.P. 145–147°.

EXAMPLE 4

20 g. of 2-{4-[3-(5H-dibenz[b,f]azepin-5-yl)-propyl]-piperazine-(1)}-ethanol (M.P. 94–96°) and 100 ml. of benzoic acid anhydride are refluxed in 250 ml. of anhydrous pyridine for 20 hours. After cooling, the reaction solution is concentrated under reduced pressure, the residue is taken up in methylene chloride and washed with ice-cold, dilute sodium hydroxide solution. The methylene chloride solution is dried with sodium sulphate and evaporated. The base which remains as an oil, in ethanol, is converted with the calculated amount of maleic acid into the dimaleate which precipitates on standing for a short time. It is filtered under suction and recrystallised from 90% ethanol whereupon the pure dimaleate of the 2-{4-[3-(5H-dibenz[b,f]azepin-5-yl)-propyl]-piperazine-(1)}-ethyl benzoate is obtained, M.P. 174–176° (compare Example 1).

EXAMPLE 5

20 g. of 5H-dibenz[b,f]azepine (M.P. 201–202°) in 150 ml. of anhydrous toluene and 15 ml. of sodium amide suspension (containing 4.2 g. [about 0.11 mol] of sodium amide in anhydrous toluene) are refluxed for 4 hours. While cooling with ice, a solution of 35 g. 2-{4-(3-chloropropyl)-piperazine-(1)}-ethyl benzoate (in the form of an oily base) in 150 ml. of anhydrous toluene is so added dropwise that the inner temperature does not rise above 50°. On completion of the exothermic reaction, the reaction mixture is refluxed for another 4 hours. After cooling, water is added, the organic phase is separated, washed with water and dried over sodium sulphate. The organic phase is then passed through a column of 500 g. of alumina (activity I) and afterwards evaporated to dryness. On reacting the oil which remains with maleic acid and working up analogously to Example 1, the dimaleate of the 2-{4-[3-(5H-dibenz[b,f]azepin-5-yl)-propyl]-piperazine-(1)}-ethyl benzoate is obtained, M.P. 174–176°.

Starting with 3,4,5-trimethoxybenzoate of 2-{4-(3-chloropropyl) - 1 - hexahydro-1H-1,4-diazepin}-1-ethanol, the compound 2-{4-[3-(5H-dibenz[b,f]azepin-5-yl)-propyl]-hexahydro-1H-1,4-diazepin-(1)}-ethyl 3,4,5 - trimethoxybenzoate is obtained (dihydrochloride M.P. 208–212°).

EXAMPLE 6

32 g. of [3-(5H-dibenz[b,f]azepin-5-yl)-propyl]-piperazine (the base is an oily substance; the hydrochloride thereof melts at 224–226°) are dissolved in 250 ml. of anhydrous benzene, 25 g. of benzoic acid-2-chloroethyl ester and 13 g. of anhydrous sodium carbonate are added and the whole is refluxed for 4 hours. The reaction mixture is then filtered and the filtrate is concentrated. The crude base which remains is worked up analogously to Example 1 and converted into the dimaleate of the 2-{4-[3 - (5H - dibenz[b,f]azepin - 5 - yl) - propyl] - piperazine-(1)}-ethyl benzoate, M.P. 174–176°, which is there described.

Starting with the 3,4,5-trimethoxy benzoic acid-3-chloropropyl ester, the 3-{4-[3-(5H-dibenz[b,f]azepin-5-yl)-propyl]-piperazine-(1)}-propyl 3,4,5-trimethoxy-benzoate is obtained in an analogous manner; dihydrochloride hydrate M.P. 212–214°.

EXAMPLE 7

15 g. of methane sulphonic acid ester of 2-{5H-dibenz[b,f]azepin}-ethanol and 12 g. of benzoic acid ester of 1-piperazineethanol in 60 ml. of dry pyridine are refluxed for 2 hours. After cooling, the reaction solution is concentrated under reduced pressure, the residue is taken up in methylene chloride and washed with water. The methylene chloride solution is dried with sodium sulphate and concentrated. The oil which remains is dissolved in benzene. The solution is passed through a column of 200 g. of alumina (activity I) and then evaporated. The residue is taken upon in ethanol and on adding ethanolic hydrochloric acid, the hydrochloride of the benzoic acid ester of 2-{4-[2-(5H-dibenz[b,f]azepin-5-yl)-ethyl]-piperazine-(1)}-ethanol is obtained; M.P. 203–206°.

The following compounds are obtained in an analogous manner: the benzoic acid ester of 2-{4-[2-(10,11-dihydro-5H - dibenz[b,f]azepin - 5-yl) - ethyl]-piperazine-(1)} ethanol; the dimaleate melts at 155–158°;

the benzoic acid ester of 2-{4-[2-(5H-dibenz[b,f]azepin-5-yl)-1-methyl-ethyl]-piperazine-(1)}-ethanol.

The methane sulphonic acid ester used in the above example can be produced as follows:

14 g. of methane sulphonic acid chloride are added dropwise to a well stirred solution cooled to −10° of 25 g. of 2-{5H-dibenz[b,f]azepin}-ethanol in 75 ml. of dry pyridine, after which the whole is stirred for 2 hours at room temperature. The reaction solution is then poured into water, filtered under suction and washed with water. The crude methane sulphonic acid ester melts, when recrystallised from methylene chloride/petroleum ether, at 148–151°. It can be used for further reaction without further purification.

The methane sulphonic acid esters of 2-{10,11-dihydro-5H-dibenz[b,f]azepin}-ethanol (M.P. 136–138°) and of 2-{5H-dibenz[b,f]azepin}-1-methyl-ethanol (M.P. 145°) are obtained in an analogous manner.

The starting materials for these methane sulphonic acid esters can be produced as follows:

40 g. of 10,11-dihydro-5H-dibenz[b,f]azepine (M.P. 106–107°) are metallised with 8.2 g. of sodium amide in 250 ml. of anhydrous toluene. A solution of 10.5 g. of ethylene oxide in 70 ml. of anhydrous toluene is added dropwise to the suspension formed at 40–50°. The whole is then stirred for 1 hour at 40–50° and then for 4 hours at room temperature. The reaction mixture is then poured into water, filtered under suction and the filter residue is washed with water. Recrystallisation from 95% ethanol yields pure 2 - {10,11 - dihydro-5H-dibenz[b,f]azepin}-ethanol, M.P. 115–117; 2-{5H-dibenz[b,f]azepin}-ethanol, M.P. 88–89°, and 2-{5H-dibenz[b,f]azepin}-1-methyl-ethanol, M.P. 108–110° can be produced in the same way.

EXAMPLE 8

11 g. of 4-[3-(5H-dibenz[b,f]azepin-5-yl)-propyl]-3-methylpiperazine, 12 g. of benzoic acid - 2 - chloroethyl ester and 20 g. of anhydrous potassium carbonate in 100 ml. of dimethyl formamide are heated for 12 hours at 50–60°. After cooling, the reaction mixture is filtered, the filtrate is concentrated in vacuo and the crude base which remains is worked up analogously to Example 1 and converted into a salt. In this way, the benzoic acid ester of 2-{4-[3-(5H-dibenz[b,f]azepin-5-yl)-propyl]-3-methylpiperazine-(1)}-ethanol is obtained. The dimaleate melts at 116–118° (recrystallised from ethanol).

The starting material necessary for the above reaction is produced, e.g., as follows:

21 g. of 5H-dibenz[b,f]azepine (M.P. 201–202°) are metallised with 4.5 g. of sodium amide in 150 ml. of anhydrous toluene. 25 g. of 4-(3-chloropropyl)-3-methyl-1-formyl-piperazine in 50 ml. of anhydrous toluene are added dropwise at 50–60° whereupon the whole is refluxed for 5 hours. After cooling, water is added to the toluene solution which is then well shaken. After removal of the water, the solution is dried over sodium sulphate and the toluene is completely removed by evaporation. The oil which remains in refluxed for 6 hours in 200 ml. of diethylene glycolmonoethyl ether with 25 g. of pulverised potassium hydroxide. The reaction solution is then poured onto water and extracted with methylene chloride. The methylene chloride solution is concentrated, the residue is dissolved in benzene and the benzene solution is extracted with 2 N hydrochloric acid. The acid extract is made alkaline and extracted with benzene. On evaporating the benzene, the 4-[3-(5H-dibenz[b,f]azepin-5-yl)-propyl]-3-methyl-piperazine is obtained. The dihydrochloride hydrate thereof melts at 143–145°.

EXAMPLE 9

30 g. of [2-(10,11-dihydro-5H-dibenz[b,f]azepin-5-yl)-ethyl]-piperazine, 30 g. of 3,4,5-trimethoxybenzoic acid-3-chloropropyl ester and 12 g. of sodium iodide are refluxed in 200 ml. of methylethyl ketone for 14 hours. After cooling, the reaction solution is completely evaporated, the residue is taken up in methylene chloride and washed with 1 N sodium hydroxide solution. The methylene chloride solution is dried and evaporated. The crude base which remains is worked up analogously to Example 1 and converted into the dihydrochloride of the 3-{4-[2-(10,11-dihydro-5H-dibenz[b,f]azepin-5-yl]-piperazine-(1)}-propyl-3,4,5-trimethoxybenzoate, M.P. 230–233°.

The above starting materials can be produced, e.g., as follows: 31 g. of the methane sulphonic acid ester of 2-{10,11-dihydro-5H-dibenz[b,f]azepin}-ethanol (produced analogously to Example 8) and 100 g. of piperazine are heated for 4 hours at 100°. After cooling, the reaction mixture is poured onto water and extracted with methylene chloride. The organic phase is washed with water, dried with sodium sulphate and concentrated. The oil which remains is dissolved in benzene and passed through a column of 600 g. of alumina (activity I). After evaporating the benzene, the residue is dissolved in anhydrous acetone and ethanolic hydrochloric acid is added whereupon the dihydrochloride of [2-(10,11-dihydro-5H-dibenz[b,f]azepin-5-yl)-ethyl]-piperazine precipitates, M.P. 220–222°.

28 g. of 3-chloropropanol, 47 g. of trimethoxybenzoyl chloride and 28 g. of dry potassium carbonate are refluxed for 5 hours in 200 ml. of benzene. After cooling, the reaction mixture is filtered and the benzene solution is washed with water, dried and evaporated. The oil which remains is distilled under high vacuum whereupon 3,4,5-trimethoxybenzoic acid-3-chloro-propyl ester is obtained, B.P. 160–162°/0.001 torr.

EXAMPLE 10

6.5 g. of 3,4,5-trimethoxybenzoic acid and 2.5 g. of pulverised potassium hydroxide are refluxed for 10 minutes in 100 ml. of isopropanol. 11.5 g. of 2-{4-[3-(5H-dibenz[b,f]azepin - 5-yl-propyl]-piperazine - (1)}-ethyl chloride (prepared from 2-{4-[3-(5H-dibenz[b,f]azepin-5-yl)-propyl]-piperazine - (1)}-ethanol and phosphorus pentachloride at 30–40° in chloroform) in 155 ml. of a mixture of isopropanol/acetone (5:2) are than added dropwise to this suspension and the whole is refluxed for 3 hours. After cooling, the mixture of solvents is evaporated off in vacuo, the residue is taken up in methylene chloride, the methylene chloride solution is washed free from acid with ice-cold 2 N sodium hydroxide solution and then washed neutral with water, dried and concentrated. The residue is dissolved in benzene and passed through 75 g. of alumina (activity I) whereupon, after evaporation of the benzene, the reaction product is obtained as an oil. On addition of maleic acid in acetone, the dimaleate of the 2-{4-[3-(5H-dibenz[b,f]azepin-5-yl)-propyl]piperazine-(1)}-ethyl 3,4,5-trimethoxybenzoate which melts at 161–162°, is obtained.

EXAMPLE 11

20 g. of 3,4,5-trimethoxybenzoyl chloride in 60 ml. of chloroform are added dropwise to a 5–10° cold solution of 15 g. of 2-{4-[3-(5H-dibenz[b,f]azepin-5-yl)-propyl]-piperazine-(1)}isopropanol in 100 ml. of dry pyridine. The reaction solution is then stirred for another 12 hours at room temperature, then completley evaporated and the residue is taken up in methylene chloride. The methylene chloride solution is washed free from acid with cold dilute sodium hydroxide solution, dried and concentrated. The residue is dissolved in benzene and the solution is passed through six times the amount of neutral alumina (activity I). After evaporation of the benene, the reaction product is obtained as a yellow oil. This, with hydrochloric acid in acetone, yields the hydrochloride of 2-{4-[3-(5H-dibenz[b,f]azepin-5-yl)-propyl]-piperazine- ( 1)}-isopropyl - 3,4,5-trimethoxybenzoate, M.P. 195–198°.

The starting material necessary for this example is produced as follows:

32 g. of [3-(5H-dibenz[b,f]azepin-5-yl)-propyl]-piperazine are dissolved in 250 ml. of anhydrous toluene and 6.5 g. of propylene oxide in 50 ml. of anhydrous toluene are slowly added. The whole is then stirred for 6 hours at room temperature and then for 2 hours at 80°. The reaction mixture is concentrated whereupon 2-{4-[3-(5H-dibenz[b,f]azepin - 5-yl)-propyl]-piperazine-(1)}-isopropanol remains as a yellow-brown oil.

We claim:

1. The 3,4,5-trimethoxybenzoic acid, p-anisic acid, o-anisic acid, veratric acid or p-chlorobenzoic acid ester of 2-{4-[3 - (5H-dibenz[b,f]azepin - 5-yl)propyl]piperazine-(1)}ethanol or 2-{4-[3-(3-chloro - 5H-dibenz[b,f]azepin-5-yl)propyl]piperazine-(1)}ethanol.

2. A pharmaceutically acceptable non-toxic acid addition salt of an ester according to claim 1.

3. A compound according to claim 1 which is the 3,4,5-trimethoxybenzoic acid ester of 2-{4-[3-(3-chloro - 5H dibenz[b,f]-azepin - 5-yl)propyl]piperazine-(1)}ethanol.

4. A compound according to claim 1 which is the p-chlorobenzoic acid ester of 2-{4-[3-(5H-dibenzb,f]azepin-5-yl)propyl]piperazine-(1)}ethanol.

5. A compound according to claim 1 which is the 3,4,5-trimethoxybenzoic acid ester of 2-{4-[3 - (5H-dibenz[b,f]-azepin-5-yl)propyl]piperazine-(1)}ethanol.

References Cited

UNITED STATES PATENTS

| 3,068,222 | 12/1962 | Craig | 260—239 |
| 3,074,931 | 1/1963 | Craig | 260—268 X |
| 3,125,576 | 3/1964 | Biel | 260—268 |
| 3,325,486 | 6/1967 | Toldy | 260—268 X |
| 3,337,538 | 8/1967 | Schuler | 260—239 |

OTHER REFERENCES

Toldy et al.: Acta Chem. Acad. Sci. Hung, vol. 44, pp. 301–25 (1965); Abstracted in Chem. Abstr., vol. 63, col. 14853–5 (1965).

DONALD G. DAUS, Primary Examiner

U.S. Cl. X.R.

260—239, 544; 424—250